(12) United States Patent
Fuge et al.

(10) Patent No.: US 7,316,077 B2
(45) Date of Patent: Jan. 8, 2008

(54) PROBE FOR SENSING THE POSITION OF AN OBJECT

(75) Inventors: Jonathan Paul Fuge, Bristol (GB); Robin William Cashmore, Bristol (GB); David Collingwood, North Woodchester (GB); Mark Acres, Wotton-under-Edge (GB)

(73) Assignee: Renishaw, PLC, Gloucestershire (GB)

( * ) Notice: Subject to any disclaimer, the term of this patent is extended or adjusted under 35 U.S.C. 154(b) by 97 days.

(21) Appl. No.: 10/550,390

(22) PCT Filed: Mar. 13, 2004

(86) PCT No.: PCT/GB2004/001552

§ 371 (c)(1),
(2), (4) Date: Sep. 22, 2005

(87) PCT Pub. No.: WO2004/090467

PCT Pub. Date: Oct. 21, 2004

(65) Prior Publication Data
US 2007/0068024 A1    Mar. 29, 2007

(30) Foreign Application Priority Data
Apr. 9, 2003    (GB) ................................ 0308149.4

(51) Int. Cl.
G01B 5/00    (2006.01)

(52) U.S. Cl. ............................. 33/559; 33/504; 33/556; 33/542

(58) Field of Classification Search ........... 33/556–559, 33/561, 503–504, 832–833, 815
See application file for complete search history.

(56) References Cited

U.S. PATENT DOCUMENTS

| 4,153,998 | A |   | 5/1979 | McMurtry |
| 4,455,755 | A |   | 6/1984 | Fritsche et al. |
| 4,599,524 | A | * | 7/1986 | McMurtry .................... 33/520 |
| 6,370,789 | B1 | * | 4/2002 | Madlener et al. ............. 33/561 |
| 6,952,883 | B2 | * | 10/2005 | Jordil et al. ................... 33/504 |
| 7,145,468 | B2 | * | 12/2006 | Collingwood et al. ......... 33/556 |
| 2006/0250266 | A1 | * | 11/2006 | Collingwood et al. ...... 340/680 |

FOREIGN PATENT DOCUMENTS

| FR |   | 2 317 631 | 2/1977 |
| WO | WO 02/063235 A2 | 8/2002 |
| WO | WO 03/021182 A1 | 3/2003 |

* cited by examiner

Primary Examiner—Yaritza Guadalupe-McCall
(74) Attorney, Agent, or Firm—Oliff & Berridge, PLC

(57) ABSTRACT

A probe (10) for a machine tool has a switch (32) or other sensor for connecting its battery power supply in response to movement of the probe. In a preferred embodiment, the switch responds to rotation of the probe in the machine tool spindle. The switch (32) is responsive to linear accelerations, but is mounted in the probe so as to respond also to the rotation. A circuit is provid to discriminate between the rotation and linear movements.

12 Claims, 6 Drawing Sheets

PROBE FOR SENSING THE POSITION OF AN OBJECT

BACKGROUND OF THE INVENTION

This invention relates to probes for sensing the position of an object. It may be used on positioning apparatus such as machine tools, coordinate measuring machines, measuring robots and the like.

Particularly in numerically controlled machine tools, it is known to exchange a cutting tool for a position-sensing probe. The probe may for example be of the touch trigger type, such as shown in U.S. Pat. No. 4,153,998 (McMurtry), which is incorporated herein by reference. Such a probe has a workpiece-contacting stylus and issues a trigger signal when the stylus contacts a workpiece. Alternatively, the probe may be of the "analogue" or "measuring" or "proportional" type, which provides an output which is a measure of the deflection of the stylus relative to a body of the probe. Rather than having a workpiece-contacting stylus, any of these types of probe may instead sense the workpiece using optical, capacitive, inductive (e.g. using eddy currents) or other non-contact techniques. The present invention may be used with any of these and with other types of probes.

Since such a probe for use in machine tools is exchangeable with cutting tools, it can be difficult to provide wires or cables to connect the probe's output signal to the controller of the machine. Consequently, various wireless signal transmission techniques are used, including inductive transmission, optical transmission and radio transmission. The probe then needs to be battery powered. To conserve battery life, it is desirable that the probe should only be switched on when in use.

A known technique for switching on such a probe is described in U.S. Pat. No. 4,599,524 (McMurtry), which is incorporated herein by reference. Here, after the probe has been inserted in the spindle of a machine tool, its battery is switched on by a brief rotation of the spindle. A centrifugal switch within the probe responds to such rotation. After use, the battery may be disconnected by a further such rotation, or by a delay element within the circuit of the probe which times out after a predetermined period of non-use of the probe.

Probes using such centrifugal switches have been successful commercially, but the centrifugal switches used are fairly bulky. Consequently, if a probe having a small physical size is required, such centrifugal switches cannot be used, and it has been necessary to use other methods for switching the probe on. A further problem with such centrifugal switches is that they are relatively expensive.

SUMMARY OF THE INVENTION

In broad outline, one aspect of the present invention replaces such a centrifugal switch with a sensor which is sensitive to linear acceleration. In a preferred embodiment the sensor is in the form of a switch, but other linear acceleration sensors may also be used. Linear acceleration sensors are available commercially, for example as switches intended for automotive use, and may be smaller and cheaper than the centrifugal switches used in the prior art. Accelerometers which provide a signal proportional to the acceleration may also be used.

Thus, this aspect of the present invention provides a probe for sensing the position of an object on positioning apparatus, comprising:

a first electric circuit responsive to the probe attaining a sensing relationship with the object;
a power supply for energising said circuit;
a sensor responsive to movement of the probe and arranged to cause the power supply to be connected to said circuit when movement is detected;
characterised in that said sensor is responsive to linear acceleration.

Preferably said sensor is positioned in the probe such that it is also responsive to rotation. Thus, after the probe has been inserted into a rotatable spindle of the position sensing apparatus, it can be rotated in order to activate the sensor and thus switch on the probe.

Where rotation is used to operate the sensor, a further problem may arise in practice, as follows. The probe may also be subjected to linear accelerations, which could activate the sensor at unwanted times. This may for example arise during the exchange of the probe between the spindle of the positioning apparatus and a tool storage magazine, or when such a storage magazine itself moves while the probe is stored in it.

Consequently, the linear acceleration sensor may be connected to a discriminating circuit for discriminating between linear acceleration and rotation, connecting the power supply to the sensing circuit when rotation is detected.

The centrifugal switch described in U.S. Pat. No. 4,599,524 is designed for use in a machine tool with a spindle which rotates about a vertical axis. This leads to a further problem: it is not always reliable if used in a machine tool having a spindle which rotates about a horizontal axis. The same would be true if a linear acceleration sensor were used in a horizontal spindle machine. This is because gravity varies the acceleration experienced by the sensor over the cycle of the rotation about the horizontal axis. At the bottom of the rotation, gravity acts in a radially outwards direction, while at the top it acts in a radially inwards direction. A centrifugal or other acceleration-sensitive switch would tend to switch off for part of the cycle and on for another part. Other types of acceleration sensor would be similarly affected.

A further aspect of the invention provides a probe for sensing the position of an object on positioning apparatus, comprising:

a first electric circuit responsive to the probe attaining a sensing relationship with the object;
a power supply for energising said first circuit;
a sensor responsive to movement of the probe and arranged to cause the power supply to be connected to said first electric circuit when movement is detected;
characterised in that a movement-discriminating circuit is connected to said sensor, the movement-discriminating circuit discriminating a movement indicating that the probe is to be used from other movements.

The movement-discriminating circuit may be responsive to receipt of a signal corresponding to a predetermined signature relating to movement of the probe.

Preferably the movement-discriminating circuit discriminates rotation of the probe from linear accelerations, connecting the power supply to the first electric circuit when rotation is detected.

In a preferred form, the movement-discriminating circuit detects whether a signal indicating rotation is received from the sensor over a period or periods of time corresponding to only a part or parts of a full revolution of the probe.

Thus, preferred embodiments of this further aspect of the present invention improve the reliability of both centrifugal and linear acceleration sensors when used to detect rotation on horizontal spindle machines, where the sensor may give a signal for only part of a full revolution.

In one preferred embodiment of this further aspect of the invention, the sensor may again be a switch.

In either aspect of the invention, the sensor may also be arranged to disconnect the power supply from said first electric circuit when a further rotation or other movement of the probe is detected. Alternatively, a timer may be provided which disconnects the power supply a predetermined period after it was connected, or after a predetermined period of non-use of the probe. The probe may have both these options for disconnecting the power supply.

Preferably the power supply is a battery.

BRIEF DESCRIPTION OF THE DRAWINGS

Preferred embodiments of the present invention will now be described by way of example, with reference to the accompanying drawings, wherein.

DESCRIPTION OF PREFERRED EMBODIMENTS

Figure 1:
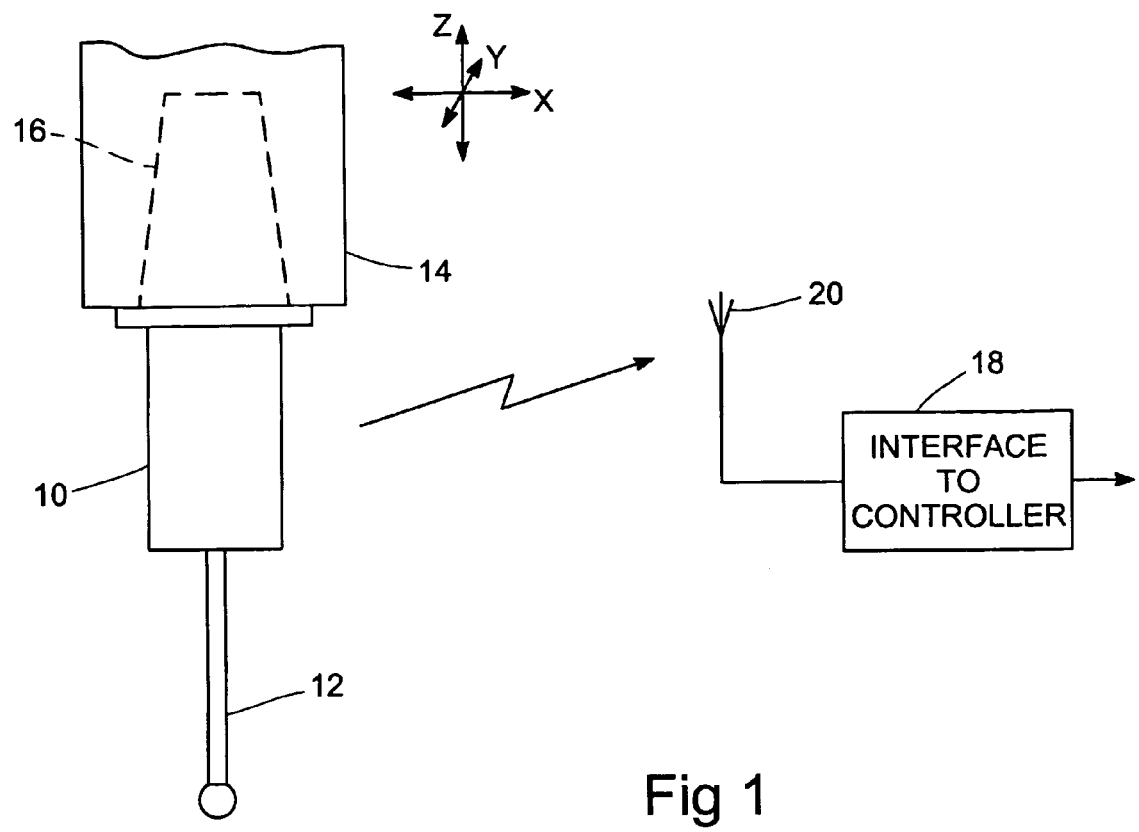
FIG. 1 schematically illustrates a probe installed in a machine tool.

Referring to FIG. 1, a touch trigger probe 10 has a shank 16 for insertion into a rotatable spindle 14 of a machine tool, in exchange for a cutting tool. The spindle can then be moved in three dimensions (in directions X,Y,Z) relative to a workpiece (not shown) in order to bring a stylus 12 of the probe 10 into contact with various points on the surface of the workpiece. A circuit within the probe, e.g. as described in U.S. Pat. No. 4,153,998, detects contact between the stylus 12 and the workpiece, and develops a trigger signal in response. The trigger signal is transmitted to an interface 18, which passes it to a CNC controller of the machine tool. This records the X,Y,Z position of the spindle 14 relative to the workpiece at the time of contact, thereby enabling dimensional measurements of the workpiece to be made.

Because the probe 10 is to be exchangeable with cutting tools in the spindle 14 of the machine tool, it would be difficult for its signal to be transmitted via a hard-wired connection. Consequently, the probe is battery powered and has a wireless signal transmission system. In the example shown in FIG. 1, a radio transmission system is used, and the signal is received by an antenna 20 connected to the interface 18. However, other wireless transmission systems for such probes are well known, including optical and inductive transmission systems, and these may equally be used. Instead of the touch trigger probe 10, any other kind of probe may be used, including those mentioned in the introduction to this specification.

Figure 2:
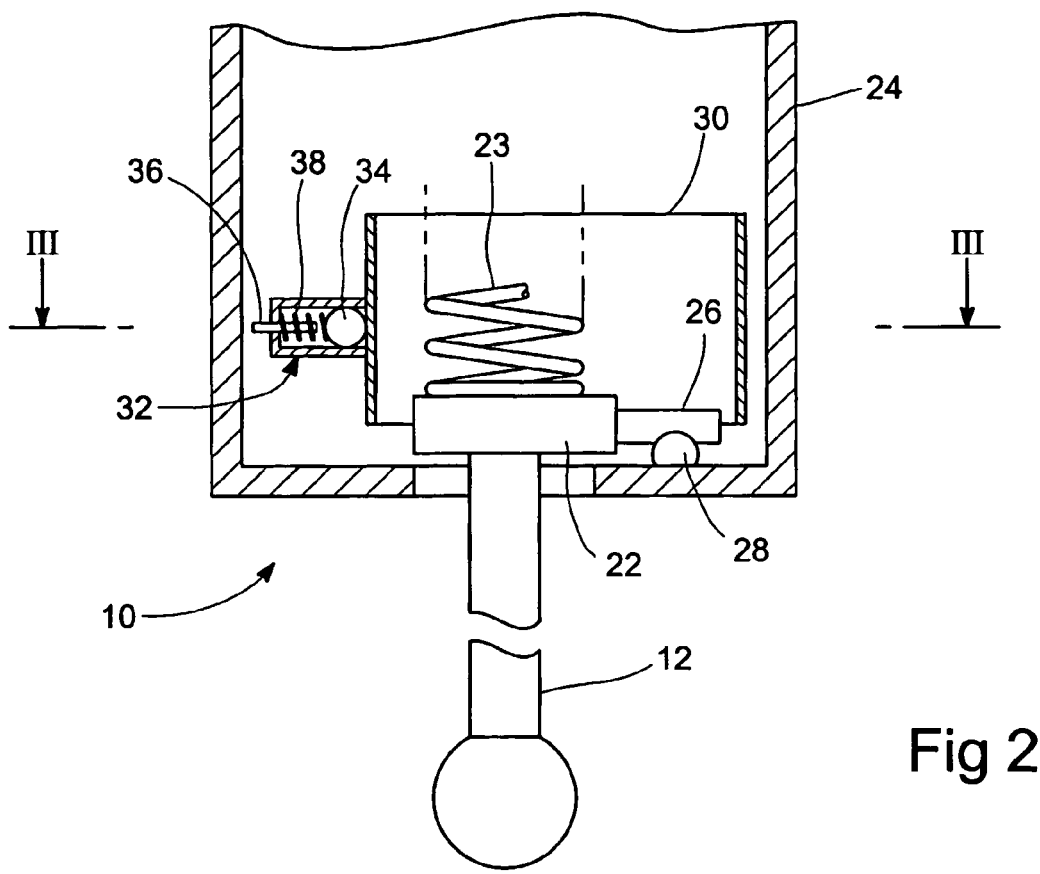
FIG. 2 is a vertical cross-section of part of the probe of FIG. 1.
Figure 3:
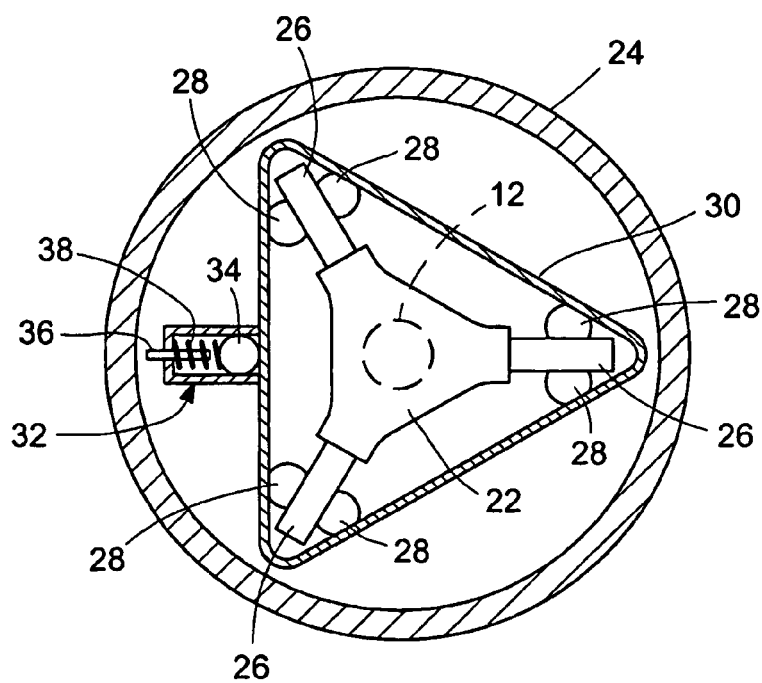
FIG. 3 is a horizontal section on the line III-III in FIG. 2.

FIGS. 2 and 3 show more detail of the touch trigger probe 10 shown in FIG. 1. The workpiece-contacting stylus 12 is connected or connectable to a stylus holder 22 within a housing 24 of the probe. The stylus holder 22 has three radially projecting rollers 26. These seat kinematically on respective pairs of balls 28, under the biasing force of a spring 23, thereby giving the stylus 12 a precisely repeatable rest position. When the stylus 12 contacts a workpiece, it is disturbed from this rest position, breaking an electrical circuit between the rollers 26 and balls 28. Reference should be made to U.S. Pat. No. 4,153,998 for further details of this and alternative arrangements which may be used.

Electronic circuitry to process the resulting signal is provided on a flexible printed circuit 30. As shown, this may advantageously be wrapped into a triangular shape, generally coaxial with the stylus 12 and stylus holder 22, and with the axis of rotation of the spindle 14. The flexible printed circuit 30 can either surround or be placed above the stylus holder 22. This results in a compact arrangement so that the probe can be built into a small housing 24. The electronic circuit includes the components required for processing the trigger signal received from the circuit through the balls 28 and rollers 26, much of which is incorporated in a dedicated programmable processor or microprocessor circuit such as a programmable integrated circuit (PIC). It also includes the components necessary for wireless transmission of the signal to the interface 18.

For simplicity, FIGS. 2 and 3 show only one of the components mounted to the flexible printed circuit 30. This is a linear acceleration switch 32. A suitable type is commercially available from American Electronic Components Inc., 23590 County Road 6, Elkhart, Ind. 46515, USA, as part #DD 1284. Such switches are also sold as g-switches, i.e. ones which react to g-forces. The switch is chosen, amongst other reasons, for its compact size, to facilitate building into the compact arrangement shown in FIGS. 2 and 3. It incorporates a ball 34 which is biased away from an adjustable contact pin 36 by a spring 38. When the probe undergoes acceleration, the ball 34 makes electrical contact with the pin 36, against the action of the spring 38, closing an electrical circuit.

The linear acceleration switch 32 is mounted off the axis of the probe (about which it is rotatable by the spindle 14). This ensures that it reacts not only to linear accelerations, but also to rotation of the spindle 14.

Since the probe 10 is battery powered, it is desirable to conserve battery life by only switching the probe on when it is required for use. The switch 32 is used to achieve this, in a similar manner to that in U.S. Pat. No. 4,599,524. It reacts to the acceleration experienced when the spindle 14 of the machine tool is rotated, and is used to switch the probe circuit to a fully "on" state, from a dormant or quiescent state where it merely monitors the switch 32.

Thus, the probe can be turned fully on for normal use after it has been inserted in the spindle 14, by a brief rotation of the spindle 14 under the control of the machine tool's CNC controller.

However, in contrast to U.S. Pat. No. 4,599,524, the switch 32 reacts not only to accelerations caused by rotation, but also to linear accelerations. For example, it could react to accelerations caused by an automatic tool changer of the machine tool when the probe is inserted into or removed from the spindle 14; or to accelerations as the spindle moves normally around the workpiece; or to movements when the probe is stored, out of use, in a storage magazine or carousel of the automatic tool changer. Arrangements to detect the rotation and to distinguish it from other such accelerations will now be described with reference to FIGS. 4, 5 and 6.

Figure 4:
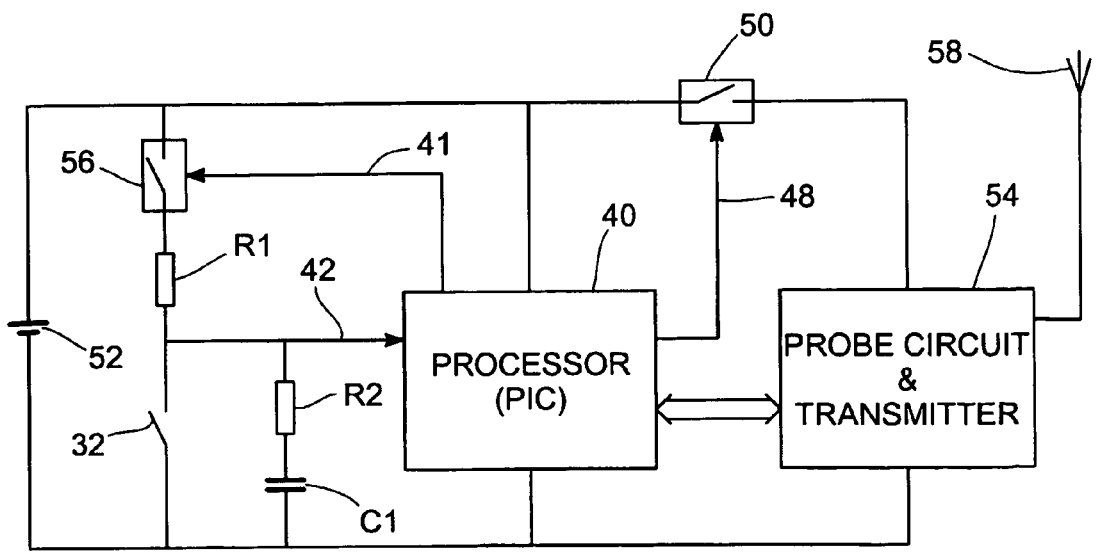
FIG. 4 is a schematic circuit diagram of part of the circuitry within the probe.

FIG. 4 shows at 40 the PIC or other processor, which is chosen to have a low current consumption since it is permanently connected to a battery 52 or other power supply located within the probe housing 24. The PIC 40 is programmed to run a number of routines. These may for example include digital filtering functions for processing the trigger signal, as described in our co-pending International Patent Application No. WO03/021182. They may also include functions which preset modes of operation of the probe, as described in International Patent Application No. WO02/063235. (International Patent Applications Nos. WO02/063235 and WO03/021182 are incorporated herein by reference.)

One such mode of operation, which may be preset into the probe during manufacture or upon installation, may determine whether the probe is to be switched on by the switch 32 rather than by some other means. If it is, then an output 41 of the PIC 40 causes an electronic switch 56 to apply a supply voltage from the probe's battery 52 to a resistor R1. As an alternative, the resistor R1 may receive a supply voltage directly from the output 41 of the PIC 40.

As shown in FIG. 4, the acceleration switch 32 is connected in series with a resistor R1, across the battery 52. The switch is connected to an input line 42 of the PIC 40, so that this input is high when the switch 32 is open and low when it is closed. A simple RC filter, comprising a capacitor C1 and a resistor R2, filters transient spikes should the switch 32 close momentarily, e.g. as a result of vibration, and the resistor R1 limits the current through the switch 32.

Figure 5:
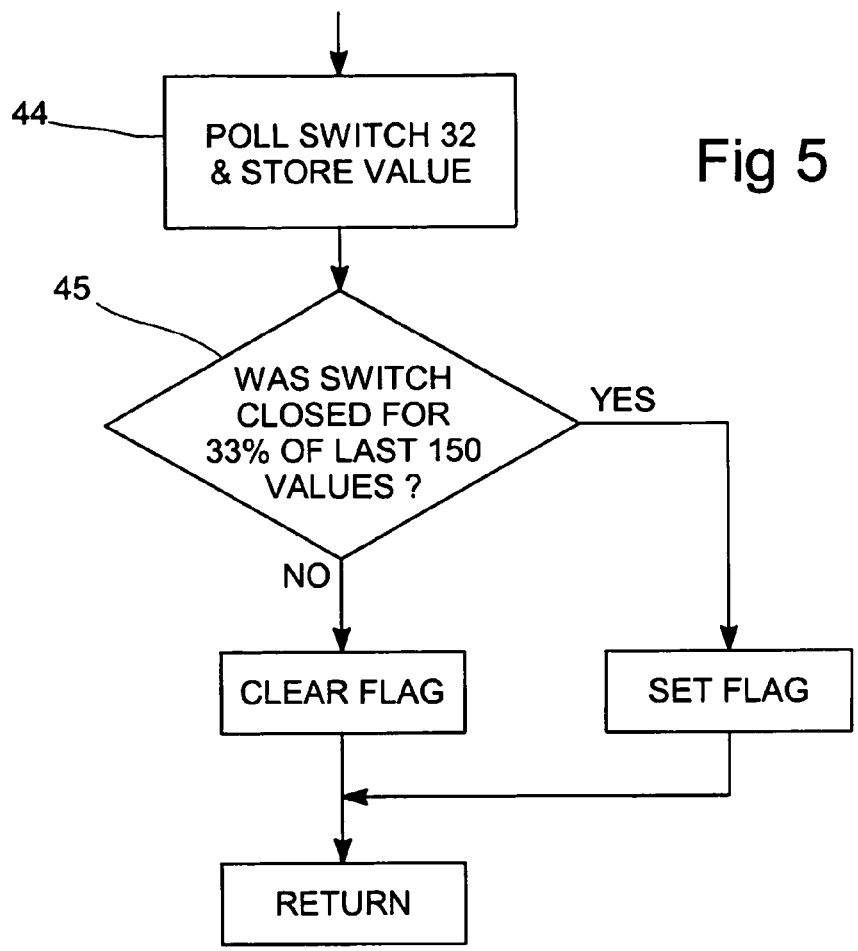
FIGS. 5, 6, 7 and 8 are flow charts of parts of a program which may run in a processor contained within the circuit of FIG. 4.

FIG. 5 shows schematically one of the program routines which runs within the PIC 40, called at regular intervals (every 1 ms in the present example). In a step 44, the input 42 from the switch 32 is polled (at the 1 ms intervals) to see whether the input is high or low. Each time it polls the switch, the routine 44 stores the resulting value in an internal memory.

A step 45 of this routine then analyses the most recent 150 such stored values to determine whether or not the switch was closed on at least 33% of the preceding 150 polls. It sets or clears a flag in the memory on the basis of this, thus indicating, on a continual rolling basis, whether the switch 32 has been closed for at least 33% of the preceding 150 ms.

This defines a first time interval, with a duration of 150 ms, which is chosen because it is approximately the time taken for one revolution of the probe at a speed of 400 revolutions per minute. Thus, the flag will remain set if the switch 32 is closed for at least a third of each revolution of the probe. This has two effects. First, it filters any contact bounce from the switch 32. Second, it ensures that the flag will remain set, even if the probe is rotated about a horizontal axis (in a machine where the spindle 14 is horizontal). In the latter case, the switch 32 may be opened by the effect of gravity for up to half of each revolution, but the flag will remain set.

Of course, the length of this first time interval could be varied, e.g. if the probe is to be rotated at a different speed when it is to be switched on. For example, if it is to be rotated at 1000 revolutions per minute, the first time interval may be 60 ms instead of 150 ms. The fraction of this time interval for which the switch must be closed in order to set the flag could also be varied—for example it could correspond to a quarter or a half of one revolution.

Figure 6:
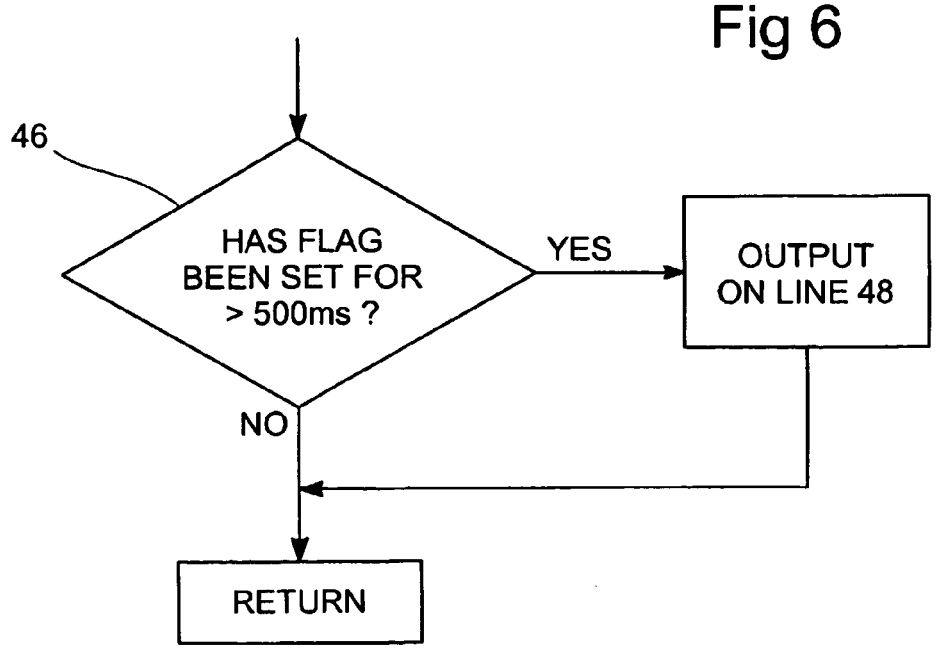

FIG. 6 shows schematically a separate routine 46, which is also called at regular intervals (e.g. every 1 ms) to poll this flag. It performs an analysis to determine whether the flag has been set (high) continuously for the preceding 500 ms, defining a second time interval, longer than the first. If so, it provides an output on a line 48 of the PIC (see FIG. 4).

The 500 ms duration of the second time interval is chosen to distinguish between deliberate rotation of the probe 10 and linear accelerations of the types exemplified above. The linear accelerations typically do not last as long as 500 ms, whereas it is easy to arrange for the probe to be rotated for a period longer than 500 ms. The duration of this second time interval could of course be greater or less than 500 ms, depending on the duration of the linear accelerations experienced in practice.

Thus, the first and second time intervals correspond to a predetermined signature relating to a specific movement of the probe (namely, deliberate rotation of the spindle). The routines of FIGS. 5 and 6 ensure that the PIC circuit 40 responds to signals from the switch 32 caused by this rotation.

The presence of the output on the line 48 thus indicates that the switch 32 was operated by the deliberate rotation of the spindle 14, and not by any other form of acceleration. As seen in FIG. 4, it operates an electronic switch 50 to apply power from the battery 52 to the heavy power consuming circuits 54 of the probe. These include the circuit through the balls 28 and rollers 26, and the wireless signal transmission circuit which transmits the probe signal via an antenna 58 in the probe.

Figure 7:
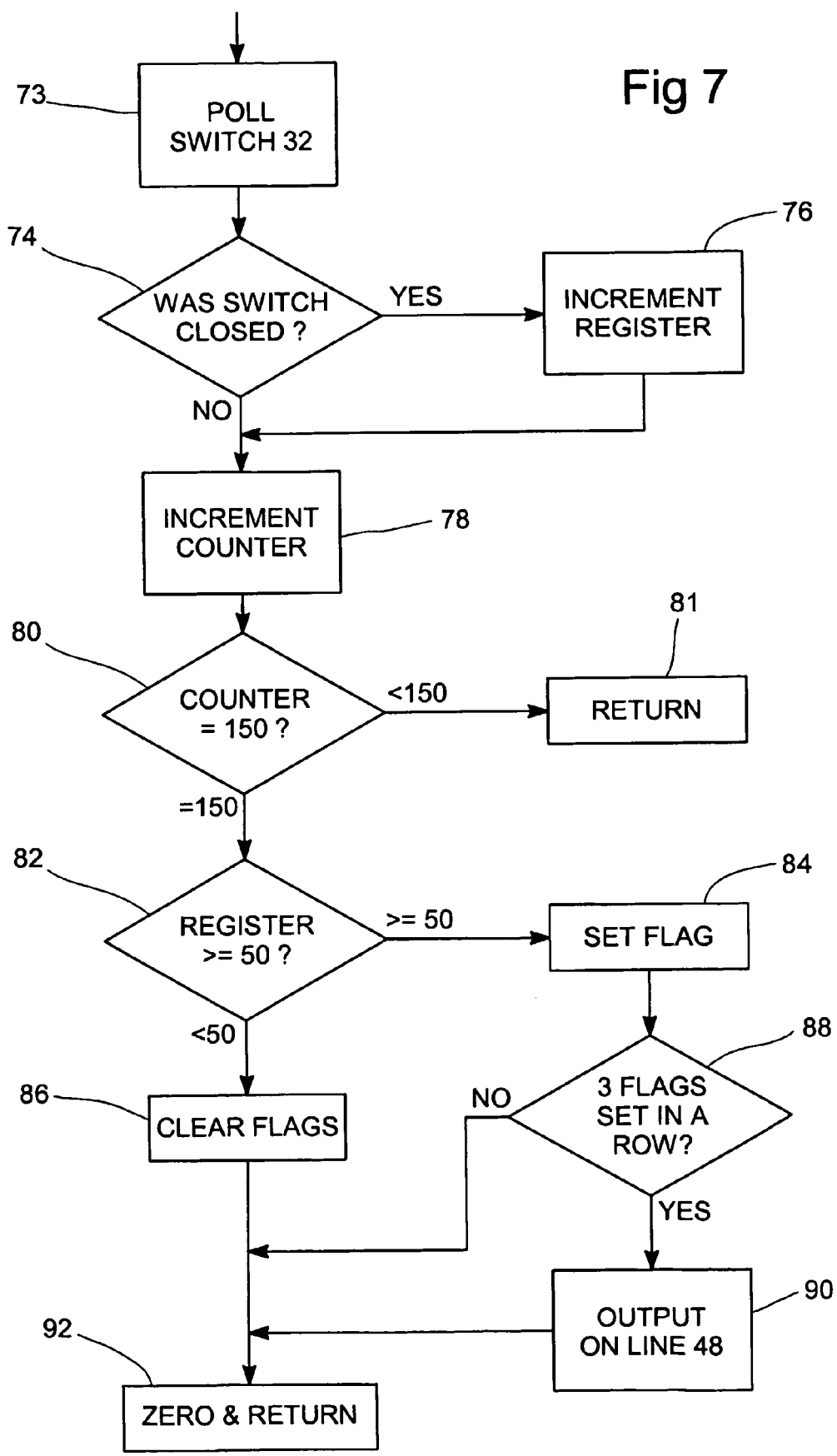

FIG. 7 shows a program routine which may be run in the processor 40 as an alternative to the routines of FIGS. 5 and 6. As with FIGS. 5 and 6, this routine is called at regular intervals, e.g. once every 1 ms.

The first step 73 of this routine polls the switch 32 (at the 1 ms intervals). A step 74 then determines whether the input from the switch is high or low, indicating whether the switch 32 is open or closed. If it is closed, a step 76 increments an internal software register kept in the memory of the processor 40.

Irrespective of whether the input from the switch 32 was high or low, in step 78 a software counter is incremented. A step 80 then tests whether the software counter has reached a count of 150. The routine only proceeds to the further steps shown in FIG. 7 if it has reached 150. If the count is less than 150, the routine exits (step 81) and takes no further action until it is called the next time, 1 ms later.

Since it is incremented every 1 ms, the counter in steps 78 and 80 indicates whether a first time interval of 150 ms has passed. If so, then in a step 82, the routine checks the count which has been attained by the register which was incremented in step 76. It determines whether the count in this register is equal to or greater than 50. If so, this indicates that the switch 32 has been closed for at least 33% of the 150 ms first time interval, and an internal flag in the memory of the processor 40 is set (step 84). Otherwise, if the register's count is less than 50, the flag is cleared (step 86).

It will be appreciated that the steps 74-82, as described so far, could be used as one way of implementing the process 45 indicated in FIG. 5. However, in the present routine, the flag-setting and clearing actions taken in steps 84 and 86 differ from those of FIG. 5.

Specifically, the FIG. 7 routine provides not one but three such flags in the memory of the processor 40. One of these three flags is set, in turn, each time step 84 is reached. This is followed by a step 88, which determines whether all three flags have been set in succession, on the last three successive passes of the step 84. If not, the routine merely exits at step 92 and takes no further action until it is next called 1 ms later.

If there have been three flags in succession, step 90 outputs a signal on line 48 of the processor 40, to switch on the probe circuits 54 (see FIG. 4). The routine then exits via step 92. Thus, the result is similar to that of the routine of FIG. 6, except that instead of a single time period of 500 ms it is determined whether flags have been set for three successive periods of 150 ms (making a total of 450 ms). As in FIG. 6, this provides a second time interval, longer than the first, which distinguishes between deliberate rotation of the probe 10 and linear accelerations.

If, in step 82, it is determined that the register has not exceeded a count of 50 during the 150 ms first time interval, then the step 86 clears all three of the flags. This indicates that the 450 ms second time interval has not been achieved, so no further action is required. The routine again exits via step 92.

Whenever the routine exits via step 92, it is necessary to zero the register and the counter, ready for future incrementing in the steps 76 and 78. This starts a new 150 ms first time interval, the next time the switch 32 is polled in step 44.

Again, it will be seen that the various time intervals correspond to a predetermined signature relating to a specific movement of the probe, i.e. deliberate rotation of the spindle. The routine of FIG. 7 again ensures that the PIC circuit 40 responds to signals from the switch 32 caused by this rotation.

After the heavy power consuming circuits 54 have been switched on, it is also desirable to switch them off when use of the probe has finished. The method by which this is to be done may be one of the modes of operation which is pre-programmed into the probe and stored in the memory of the PIC 40, as described in the above-mentioned International Patent Application No. WO02/063235. One such method is to detect a further deliberate rotation of the probe in the spindle 14. An alternative is for the probe to time out after a predetermined period of non-use.

Figure 8:
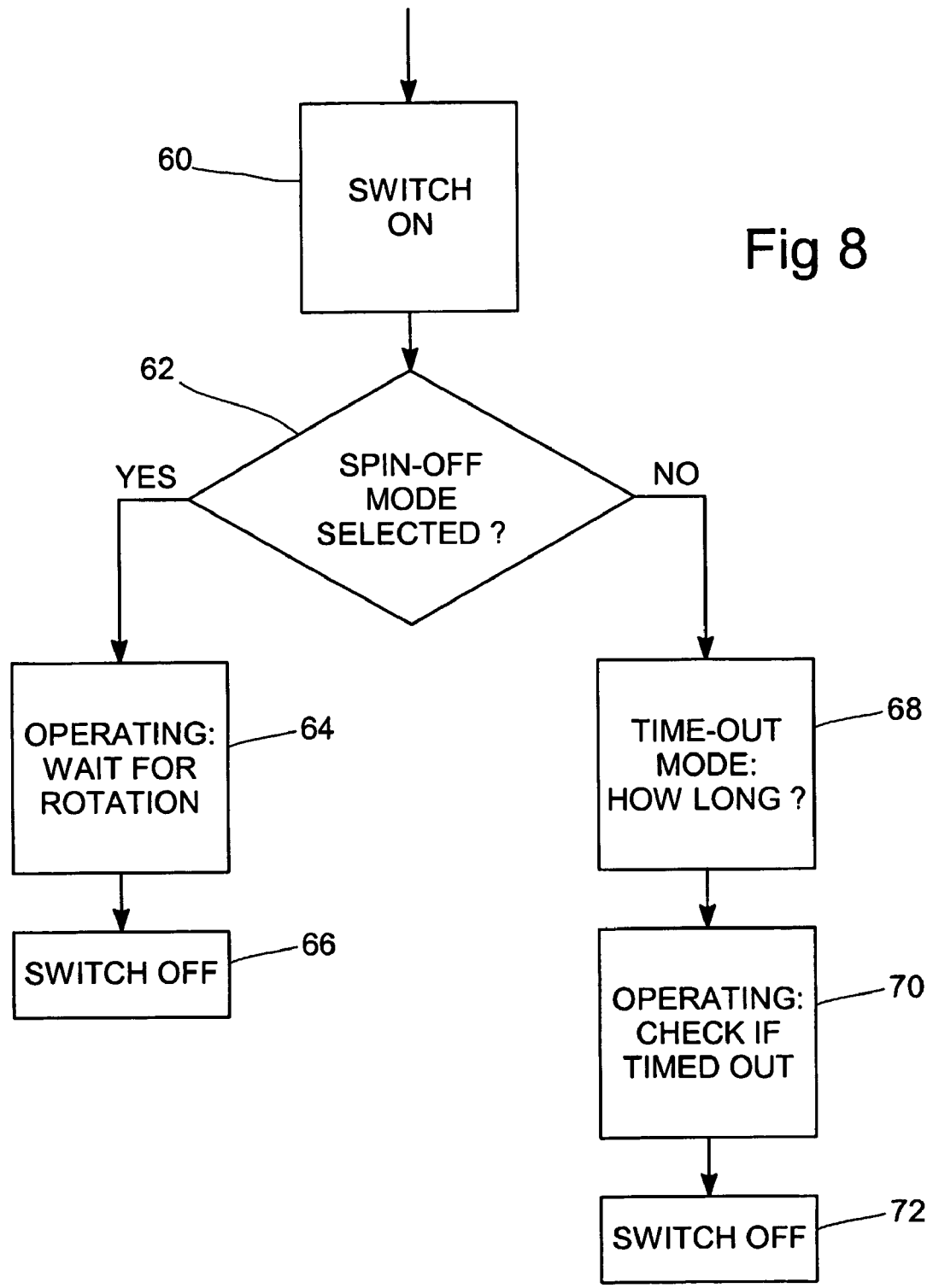

FIG. 8 shows a routine which runs at regular intervals in the PIC 40 for this purpose. This routine only runs when the probe circuits 54 have been switched on (i.e. line 48 is high). That condition is determined in an initial step 60, and if it is false the routine simply returns without performing any of the following steps.

In the next step 62, the routine checks the pre-programmed mode of operation, stored in the memory of the PIC 40. It determines if a "spin-off" mode has been pre-programmed, i.e. whether the circuits 54 are to be switched off by a further rotation of the probe. If the answer is yes, it proceeds to a step 64. In step 64, it waits for a further rotation of the probe, determined as in FIGS. 5 and 6 or FIG. 7. Meanwhile, normal operation of the probe continues. When such a further rotation is detected, the circuits 54 are switched off by taking the line 48 of the PIC low (step 66).

If it is determined in step 62 that the probe is not in the "spin-off" mode, then the circuits 54 are instead switched off by a "time-out" mode. Here, a step 68 determines the pre-programmed duration of the time-out interval, e.g. 12s, 33s and 124s. This is a pre-selectable value, as previously stored in the memory of the PIC 40 in accordance with International Patent Application No. WO02/063235.

Next, in step 70, the routine waits for the specified time-out interval. Meanwhile, normal operation of the probe continues, as in step 64. The time-out interval starts from when the probe circuits 54 were turned on. Advantageously, however, the time-out interval may be re-started each time the probe generates a trigger signal. This ensures that the probe circuits 54 are not switched off during an extended period of use of the probe. When the time-out interval expires, the circuits 54 are switched off by taking the line 48 of the PIC low (step 72).

Although not shown in FIG. 8, even in the "spin-off" mode it can be desirable to provide a long time-out interval, e.g. 90 minutes, to ensure that the probe circuits 54 are eventually switched off even if no further rotation of the probe is detected in step 64.

In place of the switch 32 shown in FIGS. 2 and 3, other acceleration-sensitive switches or sensors may be used.

For example, a mercury switch may be used. It may be normally closed, opening when acceleration takes place (in contrast to the normally open switch 32). Step 45 of FIG. 5 should then check to see if the switch has been opened, rather than closed. Technically such an arrangement works well, but mercury switches have environmental disadvantages.

Alternatively, linear acceleration switches formed from micro-machined silicon (MEMS) may be used. As previously mentioned, another alternative is to use an accelerometer which provides a signal proportional to the acceleration, with appropriate processing of the signal provided either electronically or by software in the PIC 40. Piezo or strain gauge sensors may be used.

Figure 9:
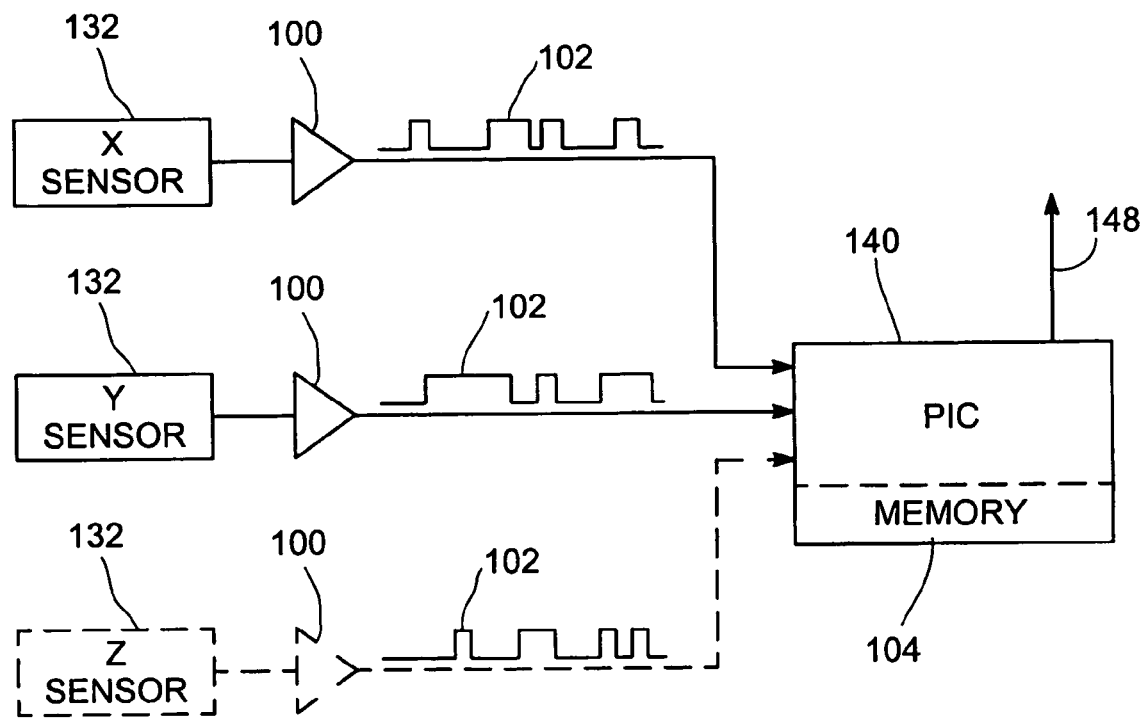
FIG. 9 is a schematic circuit diagram of part of an alternative embodiment.

FIG. 9 illustrates a further embodiment of the invention. The probe is fitted with one or more acceleration sensors 132. Preferably there are at least two, arranged at right angles in the probe so as to be responsive to movements on two orthogonal axes X and Y. There may optionally be a third such sensor 132, arranged at right angles to both the other two, so as to be responsive to movements in the Z direction (i.e. the axis of rotation of the spindle).

The sensor(s) 132 may be the same as the acceleration-sensitive switch 32 in FIGS. 2 and 3, or may be another type of acceleration-sensitive sensor as discussed above. Particularly in the latter case, signal-conditioning circuits 100 may be necessary to process the signals to a form where they can be fed to a programmable microprocessor or PIC 140, corresponding to the PIC 40 in FIG. 4.

The sensor(s) 132 provide (optionally via the signal-conditioning circuits 100) a signal or signals 102 which relate to the movements and accelerations which the probe undergoes. These include the movements and accelerations which the probe undergoes during a tool change operation, as it is removed from a tool carousel of the machine tool and inserted into the machine tool spindle. Since those movements and accelerations are the same, for a given machine tool, the signal or signals 102 form a signature which is unique to the tool change operation.

The action of tool changing (inserting the probe into the spindle prior to use) is therefore learned by the PIC 140, by storing the corresponding signature signal or signals 102 from the sensor or sensors 132 in a flash memory 104. This is done by performing one of more such tool changes in a learning step when the probe is installed on the machine tool.

During subsequent use, the PIC 140 monitors the signal(s) received from the sensor(s) 132. When they match the stored signature signal(s), to a suitable tolerance, an output is provided on a line 148, corresponding to the line 48 in FIG. 4. This connects the battery power supply to the remaining circuits of the probe. It will be seen that this discriminates between the movement of the probe during the tool change operation and other movements of the probe.

The signature signal(s) 102 are shown in FIG. 9 as being of rectangular form, so that they may be stored in the memory 104 in terms of the durations of the high and low parts of the waveform. However, if a sensor or sensors 132 is used which provides outputs proportional to acceleration, these may be digitised by an analogue to digital converter, provided in place of the signal-conditioning circuit 100. The signature may then be stored in the memory 104 as a digital representation.

Alternatively, the one or more sensors 132 may be vibration sensors which provide output(s) responsive to the vibrations which occur during the movements of the probe in a tool change operation, and particularly when the shank 16 of the probe is brought into contact with the mating parts of the spindle 14. Again, this will be unique to a given machine tool, and so the vibration signature may be learned and used in the same way as above. It will be appreciated that this arrangement discriminates the movements indirectly, as a result of the vibrations caused.

Whichever form of such signature recognition is used, the probe circuit may be disconnected from the battery in any of the ways discussed for the previous embodiments, e.g. a timeout after a period of inactivity. If it is desired to use motion or vibration detection to disconnect the battery, then a second signature signal (or a set of signature signals from each sensor 132) should be learned and stored in the memory 104, corresponding to the movement of the probe when it is removed from the spindle and returned to the tool carousel.

In place of sensors 32, 132 specifically provided to react to movement or vibration, it is possible in any of the above embodiments to make use of the sensors which are already normally provided in a probe, to sense the workpiece. For example, in the case of a probe according to U.S. Pat. No. 4,153,998, vibration or movement during a tool change operation can cause unseating of the electrical contacts which normally indicate contact of the probe's stylus with a workpiece surface. Alternatively, in an analogue or measuring or proportional probe, the sensors for the X,Y,Z movement of the stylus can act as accelerometers. In either case, if these sensors are permanently connected to the battery, they can be used to provide signature signals which the PIC 140 in FIG. 9 can learn and detect. The output on line 148 can then be used to turn on the signal transmission circuits of the probe, which are normally the heaviest consumers of power.

The invention claimed is:

1. A probe for sensing the position of an object on positioning apparatus, comprising:
    a first electric circuit responsive to the probe attaining a sensing relationship with the object;
    a power supply for energising said first circuit;
    a sensor responsive to movement of the probe and arranged to cause the power supply to be connected to said first electric circuit when movement is detected;
    characterised in that a movement-discriminating circuit is connected to said sensor, the movement-discriminating circuit discriminating a movement indicating that the probe is to be used from other movements.

2. A probe according to claim 1, wherein the sensor is an acceleration sensor mounted to be responsive to a rotation of the probe indicating that it is to be used.

3. A probe according to claim 1 wherein the movement-discriminating circuit discriminates rotation of the probe from linear accelerations, connecting the power supply to the first electric circuit when rotation is detected.

4. A probe according to claim 3, wherein the movement-discriminating circuit detects whether a signal indicating rotation is received from the sensor over a period or periods of time corresponding to only a part or parts of a full revolution of the probe.

5. A probe according to claim 1, wherein the movement-discriminating circuit is responsive to receipt of a signal corresponding to a predetermined signature relating to movement of the probe or to vibration during such movement.

6. A probe according to claim 5, wherein the predetermined signature signal corresponds to rotation of the probe.

7. A probe according to claim 5, wherein the predetermined signature signal corresponds to a predetermined sequence of movements of the probe or of vibrations of the probe while it is moved.

8. A probe according to claim 1, wherein
    said sensor is responsive to linear acceleration.

9. A probe according to claim 1, wherein the sensor is a switch.

10. A probe according to claim 1, wherein the sensor is also arranged to disconnect the power supply from said first electric circuit when a further movement of the probe is detected.

11. A probe according to claim 1, wherein a timer is provided which disconnects the power supply from said first electric circuit a predetermined period after it was connected, or after a predetermined period of non-use of the probe.

12. A probe according to claim 1, wherein the power supply is a battery.

* * * * *